(12) United States Patent
Wei (10) Patent No.: US 6,669,190 B1
(45) Date of Patent: Dec. 30, 2003

(54) DOUBLE-SIDE AUTOMATIC FEEDING APPARATUS

(75) Inventor: Frank Wei, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/193,152

(22) Filed: Jul. 12, 2002

(51) Int. Cl.7 .............................................. B65H 29/00
(52) U.S. Cl. ........................... 271/186; 271/291; 271/65
(58) Field of Search ......................... 271/186, 65, 291; 347/104, 3; 358/498; 399/401, 402

(56) References Cited

U.S. PATENT DOCUMENTS

| | | | | |
|---|---|---|---|---|
| 4,972,236 A | * | 11/1990 | Hasegawa | 399/16 |
| 5,197,724 A | * | 3/1993 | Kitajima et al. | 271/3.01 |
| 5,957,450 A | * | 9/1999 | Kida et al. | 271/291 |
| 6,250,754 B1 | * | 6/2001 | Bortolotti | 347/104 |
| 6,254,087 B1 | * | 7/2001 | Johdai et al. | 271/184 |
| 6,328,303 B1 | * | 12/2001 | Maetani | 271/273 |
| 6,398,212 B1 | * | 6/2002 | Miyake | 271/186 |
| 2002/0081120 A1 | * | 6/2002 | Oberhoffner | 399/2 |

FOREIGN PATENT DOCUMENTS

| | | | | |
|---|---|---|---|---|
| EP | 0274989 A2 | * | 7/1988 | B41J/13/00 |
| JP | 60019638 A | * | 1/1985 | B65H/29/58 |
| JP | 61018667 A | * | 1/1986 | B65H/29/58 |
| JP | 61226427 A | * | 10/1986 | B65H/1/30 |
| JP | 63196454 A | * | 8/1988 | B65H/29/60 |
| JP | 01203157 A | * | 8/1989 | B65H/29/60 |
| JP | 05338892 A | * | 12/1993 | B65H/29/58 |

* cited by examiner

*Primary Examiner*—Donald P. Walsh
*Assistant Examiner*—Matthew J. Kohner
(74) *Attorney, Agent, or Firm*—Rosenberg, Klein & Lee (57) ABSTRACT

A double-side automatic feeding apparatus comprises a paper feeder, a first paper holder, a second paper holder, a document traveling path and a paper flipping unit. The paper feeder, the first paper holder and the second paper holder are arranged apart in longitudinal direction. The document traveling path is of E shape and connected to the paper feeder, the first paper holder and the second paper holder. The document traveling path is provided with a plurality of rollers to move a document from the paper feeder to one of the first paper holder and the second paper holder. The paper flipping unit is arranged in the document traveling path and can be trigger to flip the document during the document traveling path. By the double-side automatic feeding apparatus, a document can be selectively printed or scanned on single- or double-side thereof at user's disposal.

8 Claims, 7 Drawing Sheets

DOUBLE-SIDE AUTOMATIC FEEDING APPARATUS

FIELD OF THE INVENTION

The present invention relates to a double-side automatic feeding apparatus for document, especially to a double-side automatic feeding apparatus with an E-shaped document traveling path and movable printing/scanning unit.

BACKGROUND OF THE INVENTION

The computer printer is used to print out document such as text or picture from computer. The computer printer is generally connected to the parallel printer port of the computer and commanded by the computer for printing document.

The printers can be generally classified into dot-matrix printer; inkjet printer and laser printer. Among those, the dot-matrix printer has problem of poor quality and noise and become eclipsing. The inkjet printer prints document on paper by spraying ink thereon through a nozzle and is popular for personal usage. The laser printer has advantages of high quality and high speed. However, the laser printer has higher price and generally used by business.

Moreover, the scanners become popular peripherals for computer users as multimedia and web page design are gradually prevailing. The scanner generally senses a reflected light from a document of interest and converts the sensed light signal to a digital image signal for representing the document. The digital image signal can be processed with optical character recognition software to convert the digital image signal into textual file if the original document contains textual information.

However, the existing printer or scanner can only print/scan one side of a paper at each operation. For double-side printing, the paper should be taken out and turned over; this is inconvenient.

Figure 1:
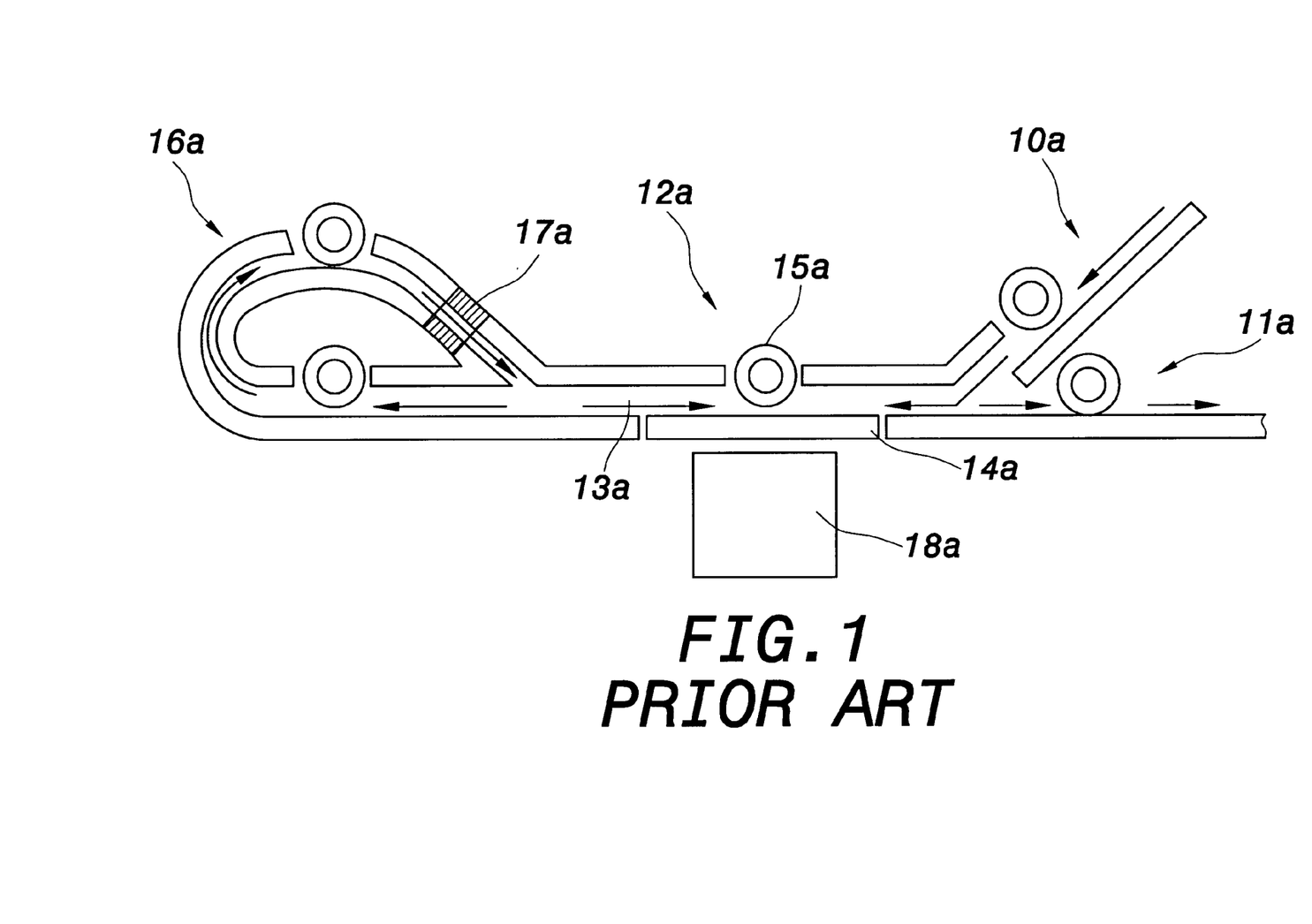
FIG. 1 shows a sectional view of prior art double-side scanner.

To scan double-sided document, scanner for double-sided image has been developed. FIG. 1 shows a prior art scanner for double-sided image, which comprises a paper feeder 10a, a paper outlet 11a at same side as the paper feeder 10a, a scanning region 12a having a document traveling path 13a bridging the paper feeder 10a and the paper outlet 11a, a transparent window 14a and a direction-controlling wheel 15a opposite to the transparent window 14a, a rotary means 16a having an entrance path and an exit path connected to scanning region 12a. The entrance path is used to guide a document with one scanned side from the scanning region 12a, the exit path flipping the document and sending the flipped document to the scanning region 12a such that an unscanned side of the document can be processed in the scanning region 12a. A sensor 17a is placed at the exit of the rotary means 16a and sends a detection signal to the direction-controlling wheel 15a when sensing the appearance of the document and the direction-controlling wheel 15a will be commanded to rotate at opposite direction. An image sensor 18a is arranged at an outer side of the transparent window 14a. When the document is fed through the paper feeder 10a and passes to the transparent window 14a, the image sensor 18a senses an image at a first side of the document. When the document is flipped by the rotary means 16a and then again passes to the transparent window 14a, the image sensor 18a senses an image at a second side of the document.

However, in above-mentioned double-sided image scanner, the document should be returned to the paper outlet 11a after a long trip with flip operation. Therefore, the propagation distance of the document is long and the scanning time is increased.

SUMMARY OF THE INVENTION

It is an object of the present invention to provide a double-side automatic feeding apparatus, wherein the document can be scanned on both sides thereof without cumbersome reverse movement.

It is another object of the present invention to provide a double-side automatic feeding apparatus with E-shaped document traveling path and movable printing/scanning unit.

To achieve above object, the present invention provides a double-side automatic feeding apparatus comprising a paper feeder, a first paper holder, a second paper holder, a document traveling path and a paper flipping unit. The paper feeder, the first paper holder and the second paper holder are arranged apart in longitudinal direction. The document traveling path is of E shape and connected to the paper feeder, the first paper holder and the second paper holder. The document traveling path is provided with a plurality of rollers to move a document from the paper feeder to one of the first paper holder and the second paper holder. The paper flipping unit is arranged in the document traveling path and can be trigger to flip the document during the document traveling path. By the double-side automatic feeding apparatus, a document can be selectively printed or scanned on single- or double-side thereof at user's disposal.

The various objects and advantages of the present invention will be more readily understood from the following detailed description when read in conjunction with the appended drawing, in which:

DETAILED DESCRIPTION OF THE INVENTION

Figure 2:
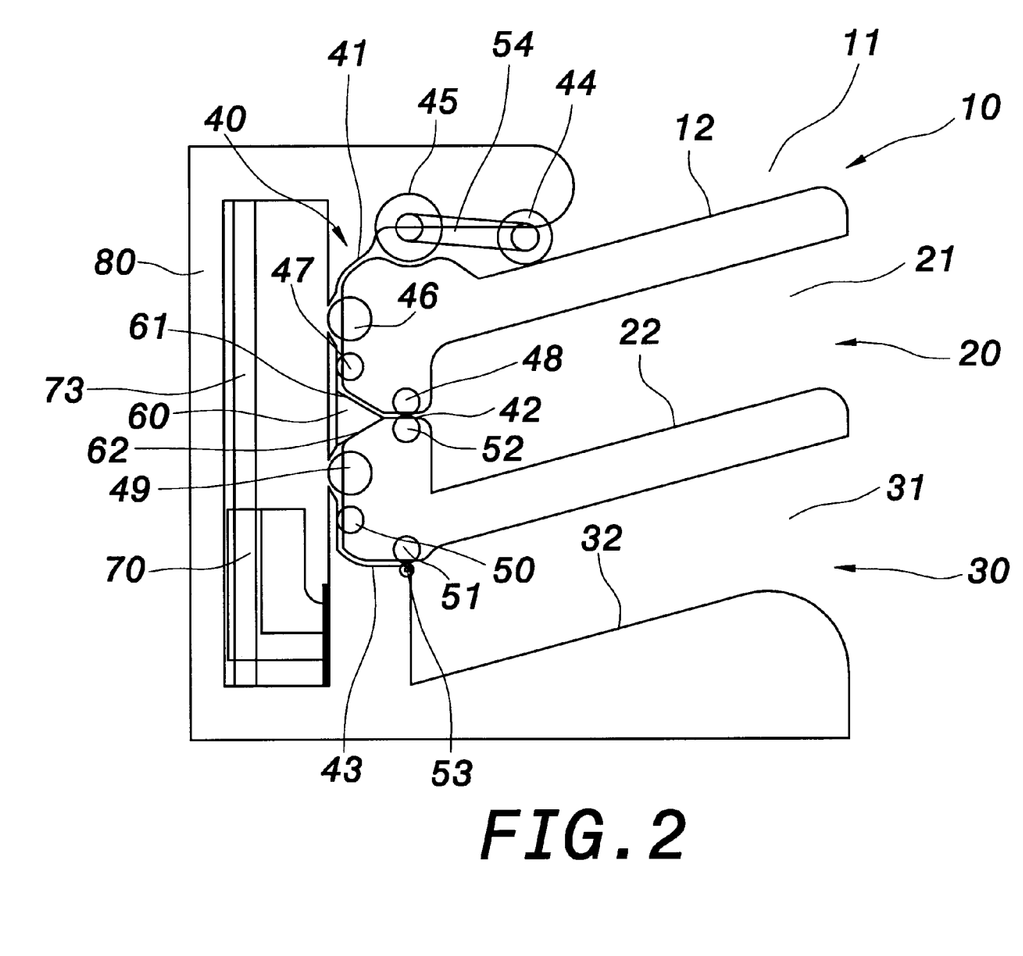
FIG. 2 shows a sectional view of the first preferred embodiment of present invention before use.

With reference now to FIG. 2, the present invention is intended to provide a double-side automatic feeding apparatus for scanner or printer. The automatic feeding apparatus of the first preferred embodiment comprises a paper feeder 10, a first paper holder 20, a second paper holder 30, a document traveling path 40, a paper flipping unit 60 and a printing unit 70.

The paper feeder 10, the first paper holder 20, and the second paper holder 30 are placed on a rack 80 of the automatic feeding apparatus of the present embodiment and stacked in altitude directions. The paper feeder 10 has a first space 11 for accommodating a document to be printed and the first space 11 has a first supporting surface 12 on bottom thereof to support the document to be printed.

The first paper holder 20 has a second space 21 for accommodating a document with single side printed and the second space 21 has a second supporting surface 22 on bottom thereof to support the document with single side printed.

The second paper holder 30 has a third space 31 for accommodating a document with double sides printed and the second space 21 has a third supporting surface 32 on bottom thereof to support the document with double sides printed.

The document traveling path 40 is of E shape and connected to the paper feeder 10, the first paper holder 20, and the second paper holder 30. The document traveling path 40 is divided into a first segment 41, a second segment 42 and a third segment 43. The first segment 41 and the third segment 43 are placed atop and below the second segment 42. The second segment 42 has one end connected to the first paper holder 20 and another end connected between one end of the first segment 41 and one end of the third segment 43. Each of the first segment 41 and the third segment 43 has another end connected to the paper feeder 10 and the second paper holder 30, respectively.

The document traveling path 40 has a plurality of rollers 44, 45, 46, 47, 48, 49, 50 and 51 for conveying the document from the paper feeder 10 to the first paper holder 20 and the second paper holder 30. In this invention, those rollers are referred as a paper-picking roller 44, a first roller 45, a second roller 46, a third roller 47, a fourth roller 48, a fifth roller 49, a sixth roller 50, and a seventh roller 51. Moreover, idlers 52 and 53 are provided for the fourth roller 48 and the seventh roller 51, respectively. The rollers 44, 45, 46, 47, 48, 49, 50 and 51 can be driven by a conventional transmission means (not shown) and the conventional transmission means will not be described in detail here.

The paper-picking roller 44 is arranged at a paper-picking arm 54, which is driven by a conventional transmission means (not shown) to swing in clockwise or counterclockwise direction, whereby the paper-picking arm 54 can drive the paper-picking roller 44 into the paper feeder 10 or out off the paper feeder 10.

The paper flipping unit 60 is arranged among the first segment 41, the second segment 42 and the third segment 43 and has a first guiding face 61 and a second guiding face 62. The first guiding face 61 and the second guiding face 62 are bevel faces or curved faces with guiding function. More particularly, the first guiding face 61 is provided between the first segment 41 and the second segment 42, and the second guiding face 62 is provided between the second segment 42 and the third segment 43. The paper flipping unit 60 can also be moved horizontally by a conventional transmission means (not shown) to flip the document along the document traveling path 40.

Figure 3:
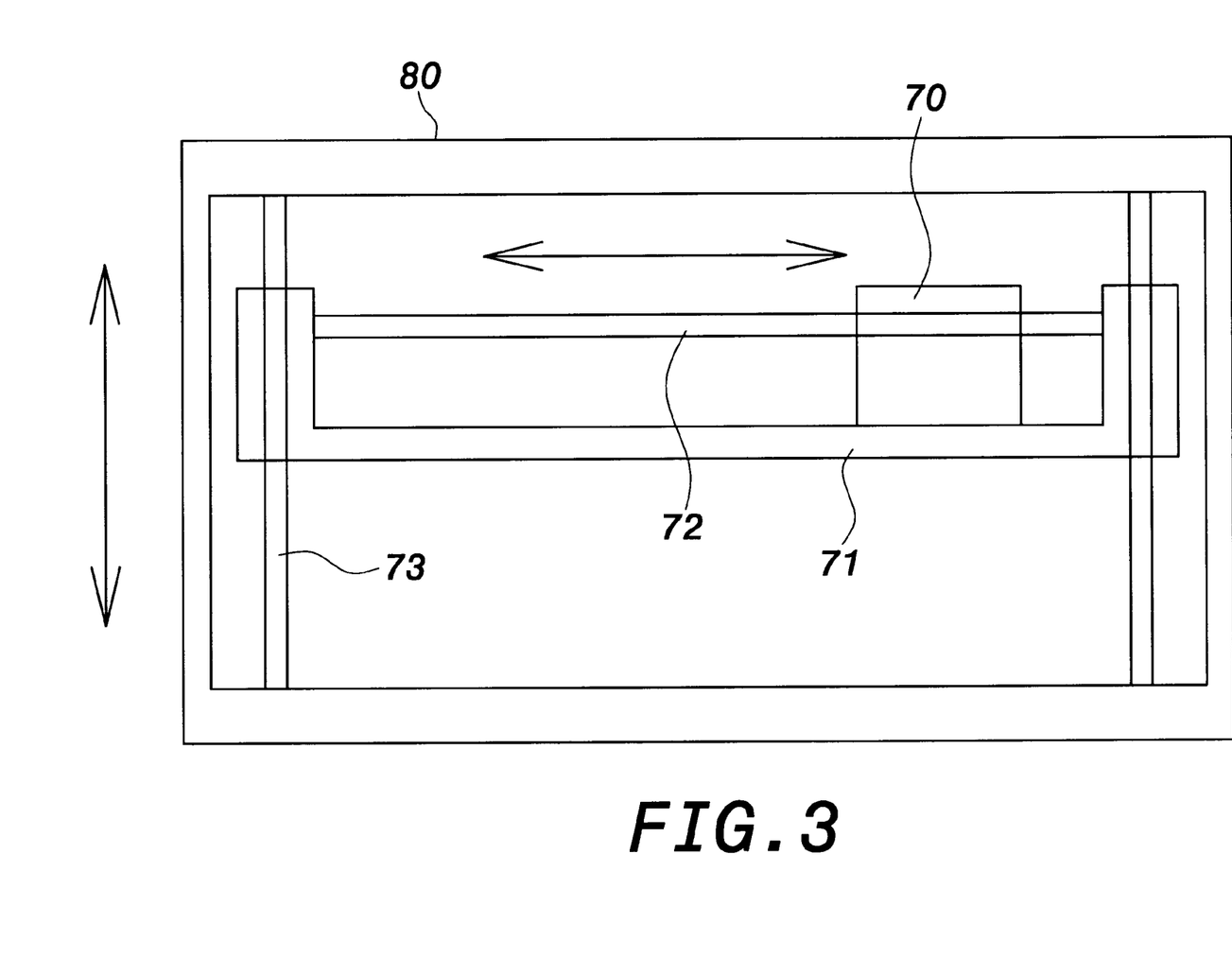
FIG. 3 shows a sectional view of the printing unit of the first preferred embodiment of the present invention.

The printing unit 70 can be, for example, an inkjet head and arranged on outer side of the document traveling path 40. As shown in FIG. 3, the printing unit 70 is arranged on a base 71 with a horizontal first guiding rod 72 on which the printing unit 70 can be laterally slid for printing. The base 71 is slidably arranged on two second guiding rods 73 of the rack 80 such that the printing unit 70 can be moved in altitude direction. Therefore, the printing unit 70 can be moved to an upper first printing position for printing a first side of the document and a lower second printing position for printing a second side of the document.

Figure 4:
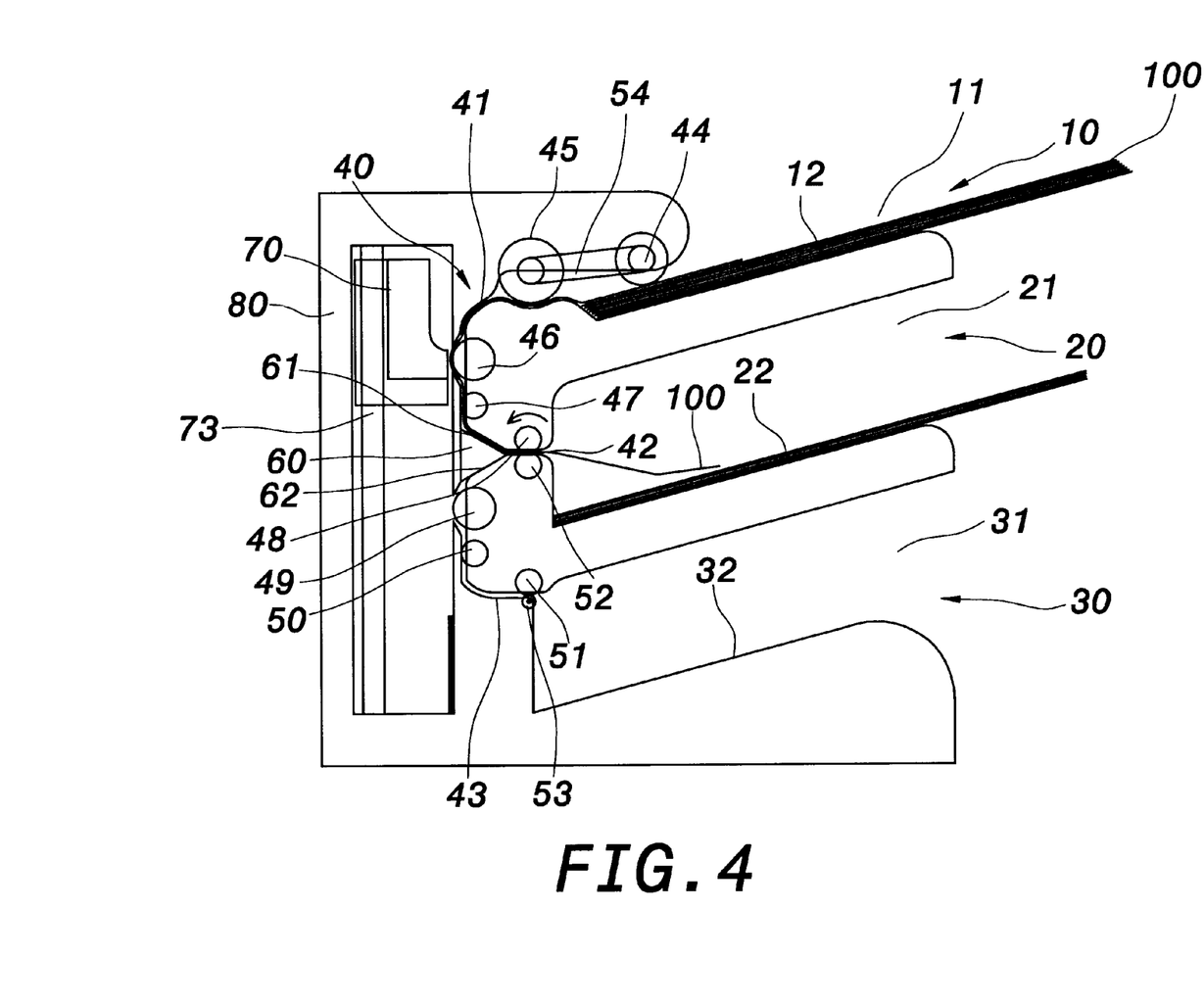
FIG. 4 shows a sectional view of the first preferred embodiment of the present invention for single-side printing.

With reference now to FIG. 4, for single-side printing, the document 100 to be printed is placed into the first space 11. The paper-picking arm 54 is lowered down by a triggering signal and the paper-picking roller 44 is in contact with the document 100. The document 100 is driven by the paper-picking roller 44 and the first roller 45 for moving into the first segment 41 of the document traveling path 40. At this time, the printing unit 70 is moved to the first printing position outside the second roller 46 for printing the first side of the document 100. Afterward, the document 100 is guided by the guiding of the first guiding face 61 of the paper flipping unit 60 and, the rotation of the third roller 47 and the fourth roller 48, thus moving into the second space 21. At this time, the single-side printing process is finished and the document 100 may be removed from the first paper holder 20.

Figure 5:
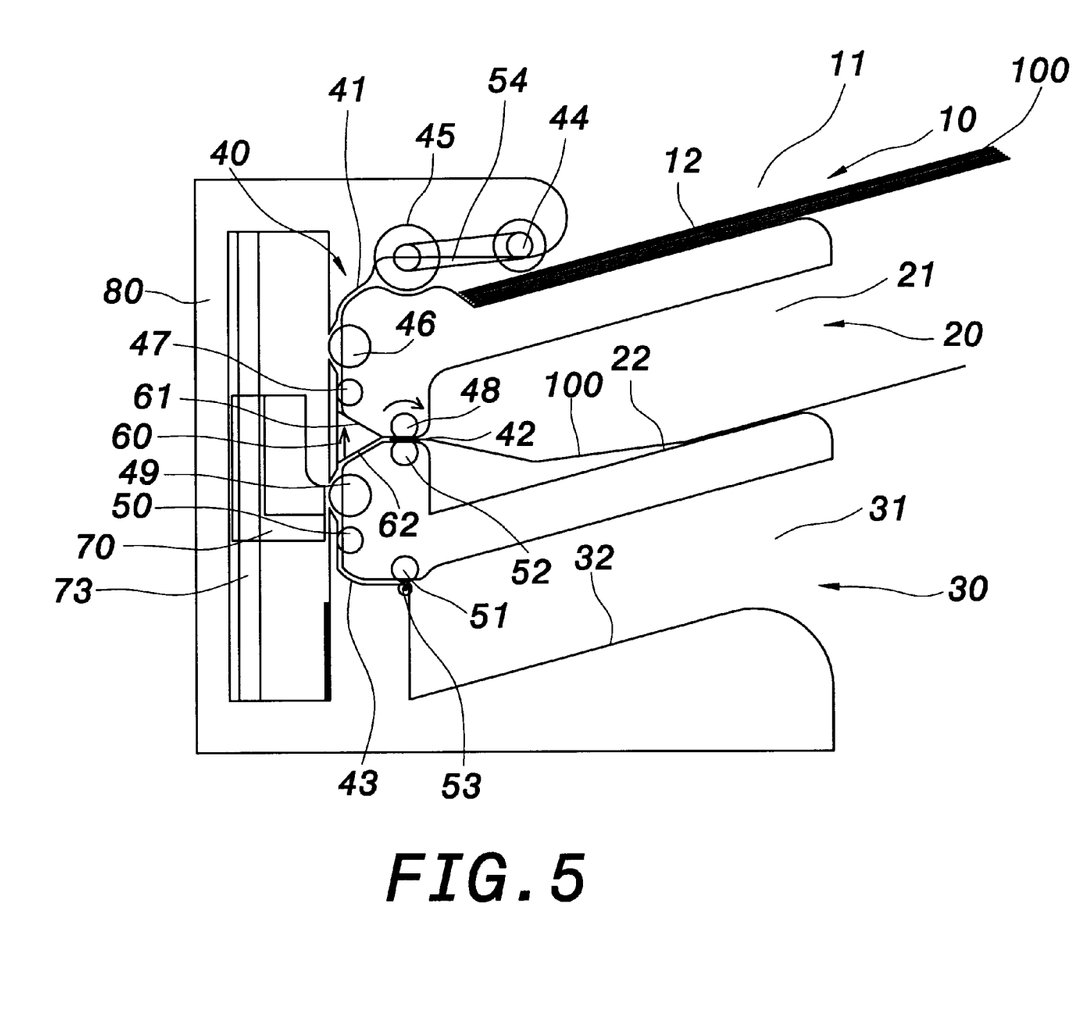
FIG. 5 shows a sectional view of the first preferred embodiment of the present invention for double-side printing.
Figure 6:
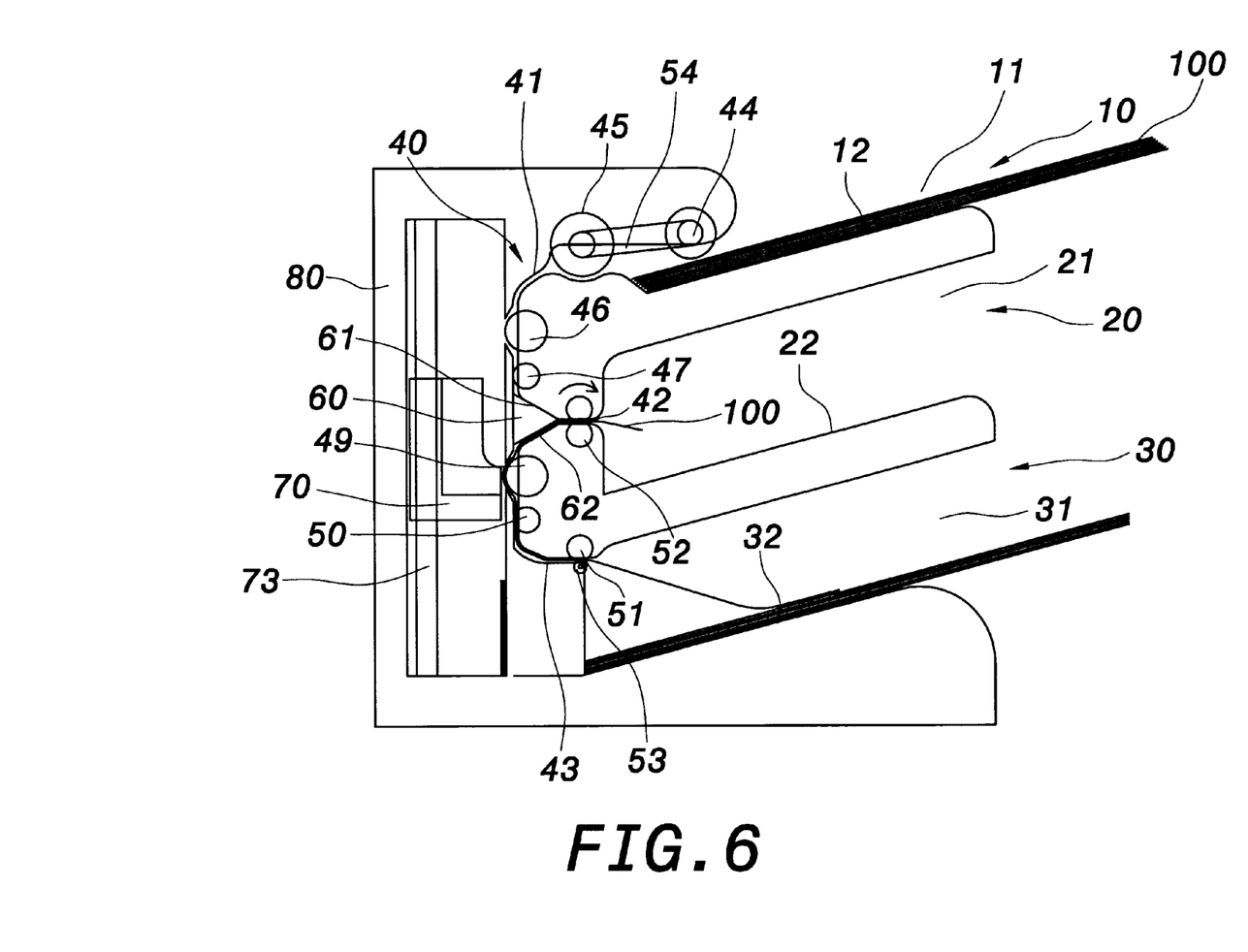
FIG. 6 shows another sectional view of the first preferred embodiment of the present invention for double-side printing.

With reference now to FIGS. 5 and 6 for double-side printing, the paper flipping unit 60 is moved up until the second guiding face 62 is moved to the second segment 42. The document 100 with single side printed can be guided by the second guiding face 62 and the reverse rotation of the fourth-roller. Therefore, the document 100 is moved to the third segment of the document traveling path 40. At this time, the document 100 is flipped over and the printing unit 70 is moved to the second printing position outside the fifth roller 49 for printing a second side of the document 100, as shown in FIG. 5. After the printing task is finished, the document 100 is driven by the fifth roller 49, the sixth roller 50 and the seven roller 51 for moving into the third space 31. At this time, the double-side printing process is finished and the document 100 may be removed from the second paper holder 30.

By the double-side automatic feeding apparatus of the present invention, the document has the feasibility of double-side printing or scanning. For double-side printing process, the conveying speed of document is fast because the paper feeder 10, the first paper holder 20, and the second paper holder 30 are arranged in altitude direction and no reverse trip is required for the document.

Moreover, the double-side automatic feeding apparatus of the present invention has an E-shaped document traveling path 40 composed of a first segment 41, a second segment 42 and a third segment 43. Moreover, the double-side automatic feeding apparatus of the present invention is used with a longitudinally movable printing-unit 70 to enhance its flexibility.

Figure 7:
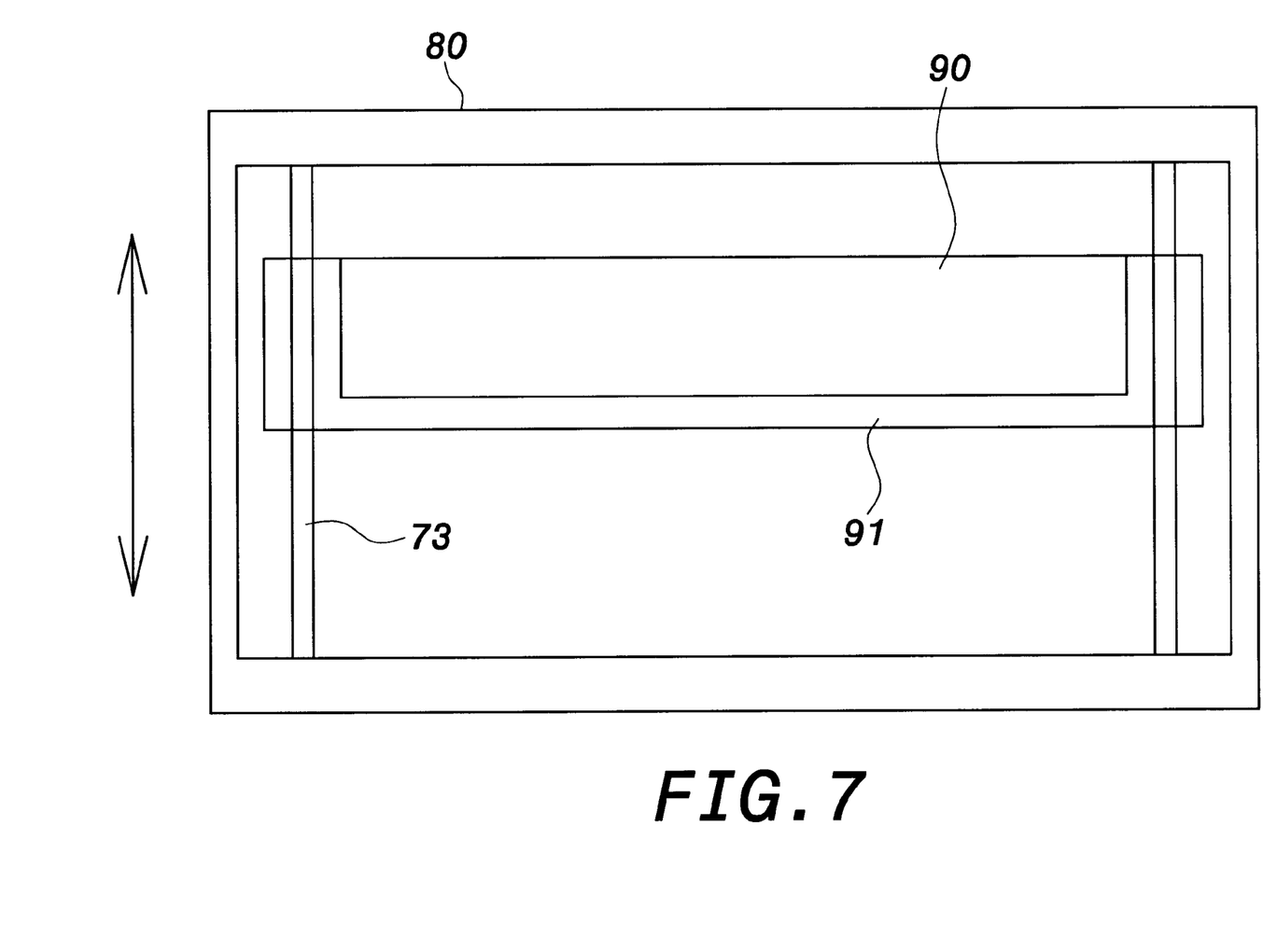
FIG. 7 shows a sectional view of the second preferred embodiment of the present invention for double-side scanning.

Moreover, as reference to FIG. 7, the printing unit 70 can be replaced by an image sensor 90 such as a contact image sensor (CIS) or a charged coupled device (CCD) when the double-side automatic feeding apparatus of the present invention is used in scanner application. The image sensor 90 is arranged on a base 91, which is slidably arranged on two guiding shafts 73 on the rack 80 on both sides thereof. Therefore, the base 91 and the image sensor 90 can be moved upward and downward and the image sensor 90 can be selectively moved to an upper first scanning position for scanning a first side of the document and a lower second scanning position for scanning a second side of the document.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A double-side automatic feeding apparatus, comprising:
   a paper feeder, a first paper holder and a second paper holder, wherein the paper feeder, the first paper holder and the second paper holder are arranged in vertically spaced relationship;
   a document traveling path connected to the paper feeder, the first paper holder and the second paper holder, the document traveling path being provided with a plurality of rollers to move a document from the paper feeder to one of the first paper holder and the second paper holder;
   a paper flipping unit arranged in the document traveling path, which can be triggered to flip the document during passage through the document traveling path; and,
   a printing unit arranged on an outer side of the document traveling path, the printing unit being selectively moved to one of a first printing position and a second printing position.

2. The double-side automatic feeding apparatus as in claim 1, wherein the paper feeder has a first space for accommodating the document and the first space has a first supporting surface on bottom thereof to support the document.

3. The double-side automatic feeding apparatus as in claim 1, wherein the first paper holder has a second space for accommodating the document and the second space has a second supporting surface on bottom thereof to support the document.

4. The double-side automatic feeding apparatus as in claim 1, wherein the second paper holder has a third space for accommodating the document and the third space has a third supporting surface on bottom thereof to support the document.

5. The double-side automatic feeding apparatus as in claim 1, wherein the document traveling path is divided into a first segment, a second segment and a third segment; the paper flipping unit has a first guiding face provided between the first segment and the second segment, and a second guiding face provided between the second segment and the third segment.

6. The double-side automatic feeding apparatus as in claim 1, further comprising at least one idler used with the rollers.

7. The double-side automatic feeding apparatus as in claim 1, wherein one of the rollers is a paper-picking roller and arranged at a paper-picking arm, which can move the paper-picking roller into or out of the paper feeder.

8. A double-side automatic feeding apparatus, comprising:
   a paper feeder, a first paper holder and a second paper holder, wherein the paper feeder, the first paper holder and the second paper holder are arranged in vertically spaced relationship;
   a document traveling path connected to the paper feeder, the first paper holder and the second paper holder, the document traveling path being provided with a plurality of rollers to move a document from the paper feeder to one of the first paper holder and the second paper holder;
   a paper flipping unit arranged in the document traveling path, which can be triggered to flip the document during passage through the document traveling path; and,
   an image sensor arranged on an outer side of the document traveling path, the image sensor being selectively moved to one of a first scanning position and a second scanning position.

* * * * *